United States Patent [19]

McCallum

[11] Patent Number: 5,779,383
[45] Date of Patent: Jul. 14, 1998

[54] BRAKED MECHANICAL JOINT ASSEMBLY

[76] Inventor: Dennis L. McCallum, 38940 Jasper-Lowell Rd., Fall Creek, Oreg. 97438

[21] Appl. No.: 909,552

[22] Filed: Aug. 12, 1997

Related U.S. Application Data

[63] Continuation-in-part of Ser. No. 625,748, Mar. 28, 1996, Pat. No. 5,713,688.

[51] Int. Cl.$^6$ .................................................. F16D 3/16
[52] U.S. Cl. .............................. 403/57; 403/74; 403/348; 403/31; 294/119.4; 188/83
[58] Field of Search ...................... 403/57, 74, 58, 403/110, 164, 368, 367, 370, 372, 334, 374, 373, 31, 324, 321, 348, 350, 349; 188/83, 196 D; 294/119.4, 86.4

[56] References Cited

U.S. PATENT DOCUMENTS

| 765,225 | 7/1904 | Colin | 403/348 X |
|---|---|---|---|
| 2,956,826 | 10/1960 | Nord | 403/368 |
| 3,305,281 | 2/1967 | Dumpis | 403/164 X |
| 3,501,183 | 3/1970 | Stratienko | 403/370 |
| 3,776,651 | 12/1973 | Peter et al. | 403/370 X |
| 4,425,050 | 1/1984 | Durand | 403/31 X |
| 4,616,948 | 10/1986 | Jelfs | 403/31 X |
| 5,451,087 | 9/1995 | Beaulieu | 188/83 X |
| 5,551,794 | 9/1996 | Aarre et al. | 403/367 X |
| 5,601,161 | 2/1997 | Brigden | 188/83 |
| 5,649,778 | 7/1997 | Lin | 403/31 |
| 5,713,688 | 2/1998 | McCallum | 403/57 |

FOREIGN PATENT DOCUMENTS 2886 of 1894 United Kingdom .................. 403/110

OTHER PUBLICATIONS

ESCO publication F/GRP–332–0996—Snubber Characteristics Eight Styles 1970 through current, pp. 1–17, 1995.

*Primary Examiner*—Harry C. Kim
*Attorney, Agent, or Firm*—David S. Alavi

[57] ABSTRACT

A braked universal joint assembly for rotatably joining two members is described wherein both load bearing and braking are performed by conical surfaces. The joint body comprises bores defining rotation axes, each bore comprising two frusto-conical sections. Rotation assemblies for nonrotatably engaging the joined members comprise a pair of brake cones, each having a frusto-conical section, and friction cones compressed between the frusto-conical sections of the bores and the frusto-conical sections of the brake cones. Rotation occurs by motion of the joined members and the engaged brake cones relative to the joint body. Load forces and braking torques are borne by the frusto-conical sections of the bores and brake cones and by the friction cones.

12 Claims, 9 Drawing Sheets

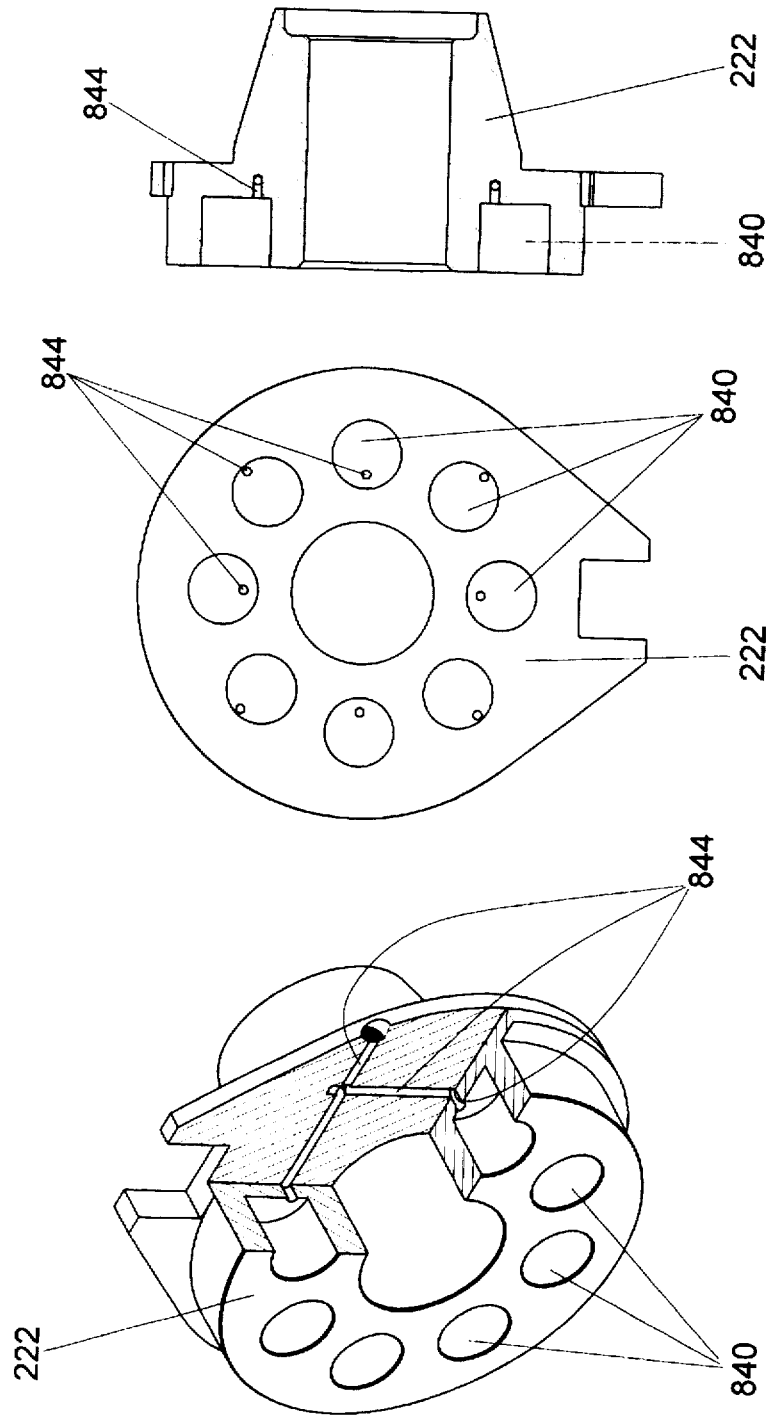

5,779,383

1

BRAKED MECHANICAL JOINT ASSEMBLY

This application is a Continuation-in-Part of application Ser. No. 08/625,748 filed Mar. 28, 1996, U.S. Pat. No. 5,713,688.

FIELD OF THE INVENTION

The field of the present relates to mechanical joints incorporating braking mechanisms. In particular, a mechanical joint is described herein which incorporates frusto-conical surfaces for load bearing and for generating friction for producing braking torque.

BACKGROUND

A mechanical joint assembly is an assembly which allows two members to be mechanically joined but allows rotation about an axis of one member with respect to the other. A universal joint is a mechanical joint assembly providing rotation about two substantially orthogonal axes. Such a joint is useful in applications in which two members must be mechanically joined but must be allowed to assume an arbitrary relative angle.

In some applications it is desirable for the motion of the moving members about the universal joint to be restricted by braking. Such a braked universal joint is useful in applications wherein a first joined member is a boom with a second joined member suspended therefrom being some load carrying means, wherein motion of the load carrying means must be restricted, particularly when not loaded. One particular application of a braked universal joint is suspension of a grappler from a boom of a logging skidder. This application, and several previous designs for braked universal joints used therein are described in: U.S. Pat. No. 4,335,914 entitled "Grapple pivot joint with swing dampener"; U.S. Pat. No. 4,417,759 entitled "Grapple pivot joint with swing dampener"; U.S. Pat. No. 4,573,728 entitled "Snubbing apparatus for grapples and the like"; U.S. Pat. No. 4,679,839 entitled "Grapple snubber"; U.S. Pat. No. 4,715,641 entitled "Mounting apparatus for a grapple head assembly"; U.S. Pat. No. 5,110,169 entitled "Grease loaded grapple dampener", U.S. Pat. No. 5,451,087 entitled "Damper for a grapple", and U.S. Pat. No. 5,601,161 entitled "Snubber brake assembly", each of said patents being incorporated by reference as if fully set forth herein.

A braked universal joint 100 for rotatably joining two members and previously known in the art is shown in FIGS. 1 and 2, and comprises: a central joint body 102 comprising four substantially orthogonal faces 103, 104, 105, and 106 and two bores 107 and 108 defining two substantially orthogonal rotation axes 109 and 110, a first end of bore 107 being located on face 103, a second end of bore 107 being located on opposing face 105, a first end of bore 108 being located on face 104, and a second end of bore 104 being located on opposing face 106, a first bushing 111 being positioned within bore 107, and a second bushing 112 being positioned within bore 108; and two rotation assemblies, each rotation assembly being associated with one of the axes 109 and 110 and substantially nonrotatably engaging one of the two joined members. The first rotation assembly is associated with axis 110 and comprises: a shaft 114 positioned within bushing 112 and extending beyond the ends of bore 108 having a first end 116 with a transverse hole 120 therethrough and a threaded second end 118; a locking pin 134 positioned within and extending from hole 120; a first friction disc 126 positioned around shaft 114 and against face 104 of joint body 102; a second friction disc 128

2 positioned around shaft 114 and against face 106 of joint body 102; a first brake disc 122 positioned around shaft 114 and against friction disc 126 and adapted to substantially nonrotatably engage the first joined member; a second brake disc 124 positioned around shaft 114 and against friction disc 128 and adapted to substantially nonrotatably engage the first joined member; a first spring 130 positioned around shaft 114 and against brake disc 122 and against locking pin 134; a second spring 132 positioned around shaft 114 against brake disc 124; a spacer 138 positioned around shaft 114 and against spring 132; and a nut 136 threadedly engaged onto end 118 of shaft 114 and tightened against spacer 138. The second rotation assembly is associated with axis 109, has substantially the same structure as the first rotation assembly, and substantially nonrotatably engages the second joined member.

Each of the two members joined by universal joint 100 substantially nonrotatably engages one of the two rotation assemblies described hereinabove. Each joined member includes a structure for engaging the shaft and substantially nonrotatably engaging the brake discs of the corresponding universal joint rotation assembly. When assembled with the universal joint, relative rotation of the first joined member and the joint body may occur about axis 110 defined by bore 108. The load on the universal joint is borne by shaft 114 and bushing 112. The brake discs 122 and 124 rotate with the first joined member. Tightening of nut 136 results in compression of springs 130 and 132, thereby compressing friction discs 126 and 128 and joint body 102 between brake discs 122 and 124. Braking torque in the joint arises from the resulting frictional torques opposing relative rotation of brake discs 122 and 124 and the first joined member with respect to joint body 102. The degree of braking depends directly on the compressive force applied by tightening nut 136, all other conditions being equal. The friction discs 126 and 128 are fabricated from any of a variety of friction materials known in the art and are intended to be replaced as they wear out. Replacement of friction discs 126 and 128 is substantially less expensive than replacement of the entire universal joint 100, which would be required if joint body 102 and brake discs 122 and 124 came into direct contact with one another during relative rotation of the first joined member and joint body 102.

The second joined member substantially nonrotatably engages the second rotation assembly which is associated with axis 109 of universal joint 100. The structures and operation of the second joined member and second rotation assembly are substantially the same as those recited hereinabove for the first joined member and first rotation assembly. For the purposes of this specification it will be understood that any description pertaining to the structure or operation of a first joined member engaged with a first rotation assembly associated with a first rotation axis will apply substantially equally to a second joined member engaged with a second rotation assembly associated with a second rotation axis.

The braked universal joint shown in FIGS. 1 and 2 is the previously available state-of-the-art, and has enjoyed substantial commercial success. As a result of such widespread use, several inherent weaknesses and other weaknesses of this design have become apparent. One weakness relates to the load bearing function played by the shaft and bushing. Another weakness is the limited braking torques achievable with this design. Another weakness is relatively frequent failure of the entire universal joint which occurs as a result of the extreme tightening of nut 136 required to generate sufficient braking torque.

3

In the previous universal joint, the load bearing forces and braking torques are substantially borne by distinct structures within the universal joint. The primary load forces typically are substantially perpendicular to and borne by shaft 114 via bushing 112. Bushing 112 and shaft 114 must be manufactured with sufficient clearance to allow assembly of the universal joint and free rotation of joint body 102 with respect to shaft 114. This clearance results in a load concentration on one side of the bushing and consequent reduction in overall load bearing capacity of the bushing. Side loads result in even more load concentration at the ends of the bushing, leading to further reduction of the load bearing capacity of the bushing. Furthermore, this problem worsens as bushing 112 wears out and the clearance of shaft 114 within bushing 112 becomes even larger. This wear necessitates replacement of the bushing, adding to the expense and down time required to maintain the universal joint 100.

The previous universal joint employs flat brake discs 122 and 124 and friction discs 126 and 128 to produce the frictional torques opposing rotation of the brake discs 122 and 124 with respect to the joint body 102. A force normal to the surface of the brake discs is applied by tightening nut 136 on threaded end 118 of shaft 114, thereby compressing spacer 138, spring 132, brake disc 124, friction disc 128, joint body 102, friction disc 126, brake disc 122 and spring 130 against locking pin 134. In many practical applications nut 136 must be tightened to very near the yield point of the nut and shaft materials to obtain sufficient braking torque in the universal joint, even when the nut and shaft are fabricated from an extremely hard material such as heat treated high carbon steel. Harder materials are prohibitively expensive. Even when sufficient braking torque can be achieved, the nut and threaded shaft are often strained and/or plastically deformed to such an extent that upon replacement of worn friction discs, subsequent retightening of the nut results in reduced braking torque or in complete mechanical failure of the nut and/or threaded shaft. The probability of such a failure increases with each subsequent replacement of friction discs 126 and 128. The threaded shaft 114 and nut 136 are thus the "weak link" in previous braked universal joint designs.

SUMMARY

Certain aspects of the present invention may overcome aforementioned drawbacks of the previous art and advance the state-of-the-art of braked mechanical joint assemblies, and in addition may meet one or more of the following objects:

- To provide a braked mechanical joint assembly with a larger load bearing capacity than previously achievable;
- To provide a braked universal joint allowing larger braking torques than were previously available for a given axially applied force;
- To provide a braked universal joint which fails less frequently than previous braked universal joints; and
- To provide a braked universal joint requiring a smaller number of wearable parts and less frequent replacement of those parts than previous braked universal joints.

One or more of said objects may be achieved in the present invention by the use of substantially frusto-conical load bearing and braking surfaces in the mechanical joint assembly. The substantially frusto-conical load bearing and braking surfaces result in low-clearance fits between the various components of the joint assembly, resulting in

4 substantially uniform load distribution and therefore a larger overall load bearing capacity, a smaller rate of wear and less frequent replacement. The substantially frusto-conical braking surfaces also result in magnified forces normal to the braking surfaces for a given compressive axial force applied to the assembly. The force magnification arises from wedge-like action of the substantially frusto-conical braking surfaces in response to an axially applied force, producing larger braking torque for a given axial force, or requiring a smaller axial force to generate a given braking torque, thereby reducing the probability of and frequency of failure of the joint. The braked universal joint according to the present invention has no bushing, thereby reducing the number of wearable parts. Further, the substantially frusto-conical braking surfaces have a larger surface area than the brake discs of previous braked universal joints, resulting in a smaller rate of wear and less frequent replacement.

A preferred embodiment of the present invention comprises a universal joint assembly comprising a joint body and two rotation assemblies, one for substantially nonrotatably engaging each of two joined members. The joint body comprises two bores defining two substantially orthogonal rotation axes, each bore comprising first and second coaxial right circular substantially frusto-conical sections, the bases of each of the frusto-conical sections coinciding with opposing faces of the joint body. Each rotation assembly comprises: a shaft positioned coaxially within the bore in the joint body; a first friction cone comprising an outer right circular substantially frusto-conical surface corresponding to the first frusto-conical section of the bore and an inner coaxial right circular substantially frusto-conical surface and positioned coaxially around the shaft against the first frusto-conical section of the bore; a second friction cone comprising an outer right circular substantially frusto-conical surface corresponding to the second frusto-conical section of the bore and an inner coaxial right circular substantially frusto-conical surface and positioned coaxially around the shaft against the second frusto-conical section of the bore; a first brake cone comprising a right circular substantially frusto-conical section corresponding to the inner surface of the first friction cone, a base, an axial bore, and means for substantially nonrotatably engaging one of the joined members, and positioned coaxially around the shaft against the inner surface of the first brake cone; a second brake cone comprising a right circular substantially frusto-conical section corresponding to the inner surface of the second friction cone, a base, an axial bore, and means for substantially nonrotatably engaging the joined member, and positioned coaxially around the shaft against the inner surface of the second brake cone; and means for compressing the first and second friction cones and the joint body between the first and second brake cones. Compressing the friction cones and joint body between the brake cones generates a frictional torque opposing relative rotation of the joint body with respect to the brake cones and joined member engaged therewith about the rotation axis. A load force between the joined member and the joint body is substantially borne by the frusto-conical sections of the bore, the frusto-conical sections of the brake cones, and the friction cones.

Additional objects and advantages of the present invention may become apparent upon referring to the preferred and alternative embodiments of the present invention as illustrated in the drawings and described in the following written description and/or claims.

BRIEF DESCRIPTION OF THE DRAWINGS

FIG. 9 shows top, cross sectional, and perspective views of a hydraulically driven brake cone for a braked joint assembly according to the present invention. In the perspective view a portion of the brake cone is shown cut away.

DETAILED DESCRIPTION OF PREFERRED AND ALTERNATIVE EMBODIMENTS

Figure 1:
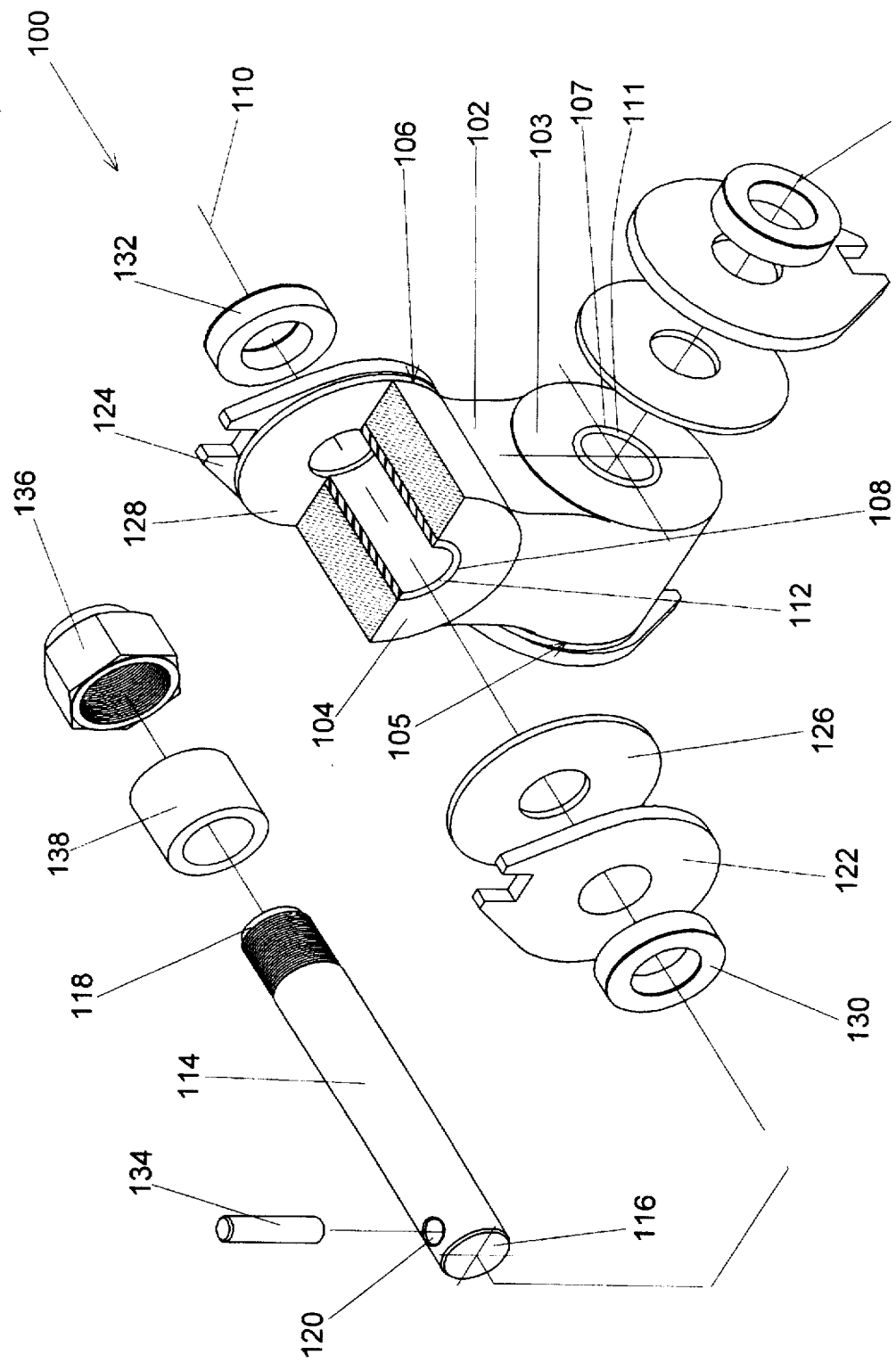
FIG. 1 is an exploded perspective view of a previous braked universal joint assembly. A portion of the central joint body is shown cut away.
Figure 2:
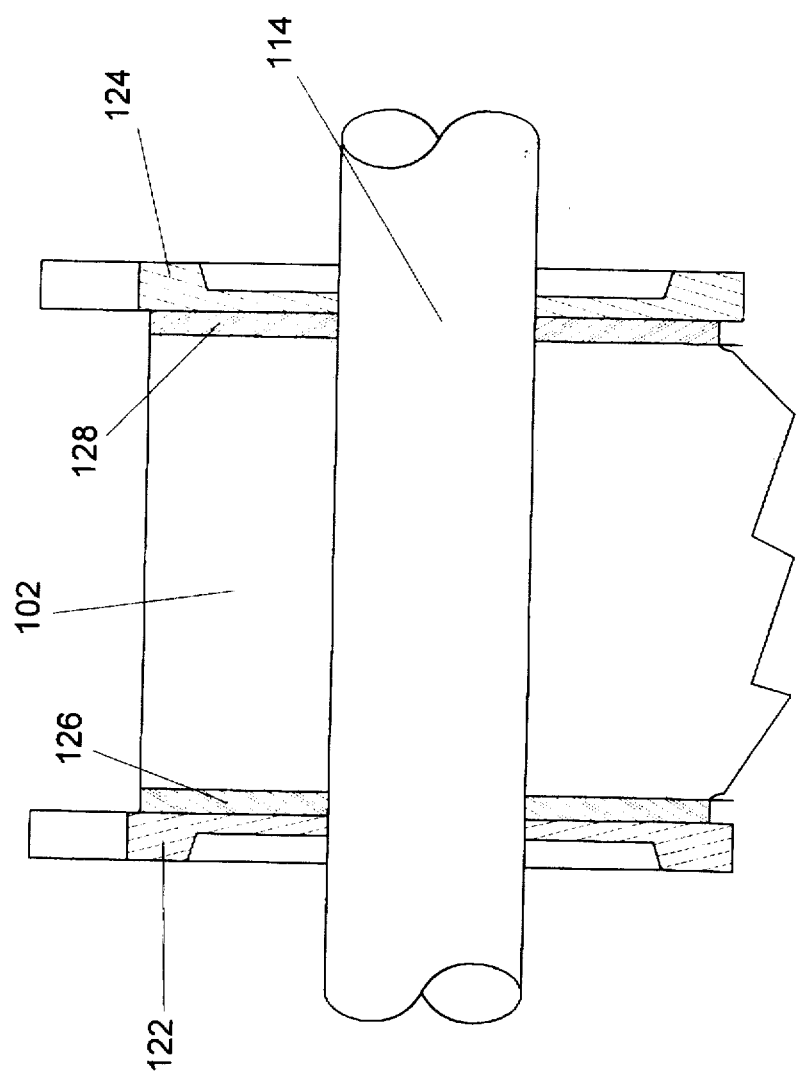
FIG. 2 is a cross sectional view through a rotation axis of a previous braked universal joint assembly.
Figure 3:
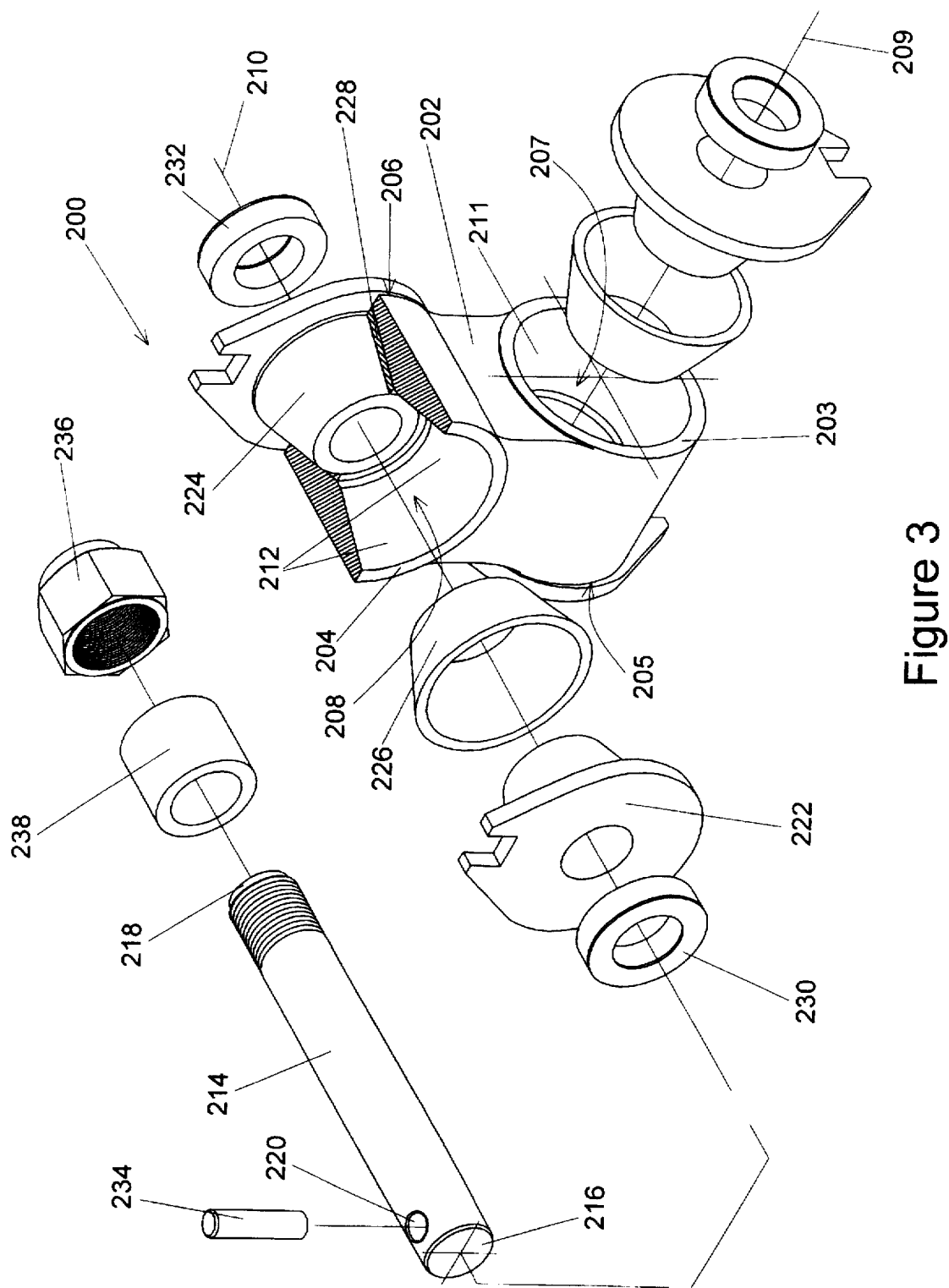
FIG. 3 is an exploded perspective view of a braked universal joint assembly according to the present invention. A portion of the central joint body is shown cut away.
Figure 4:
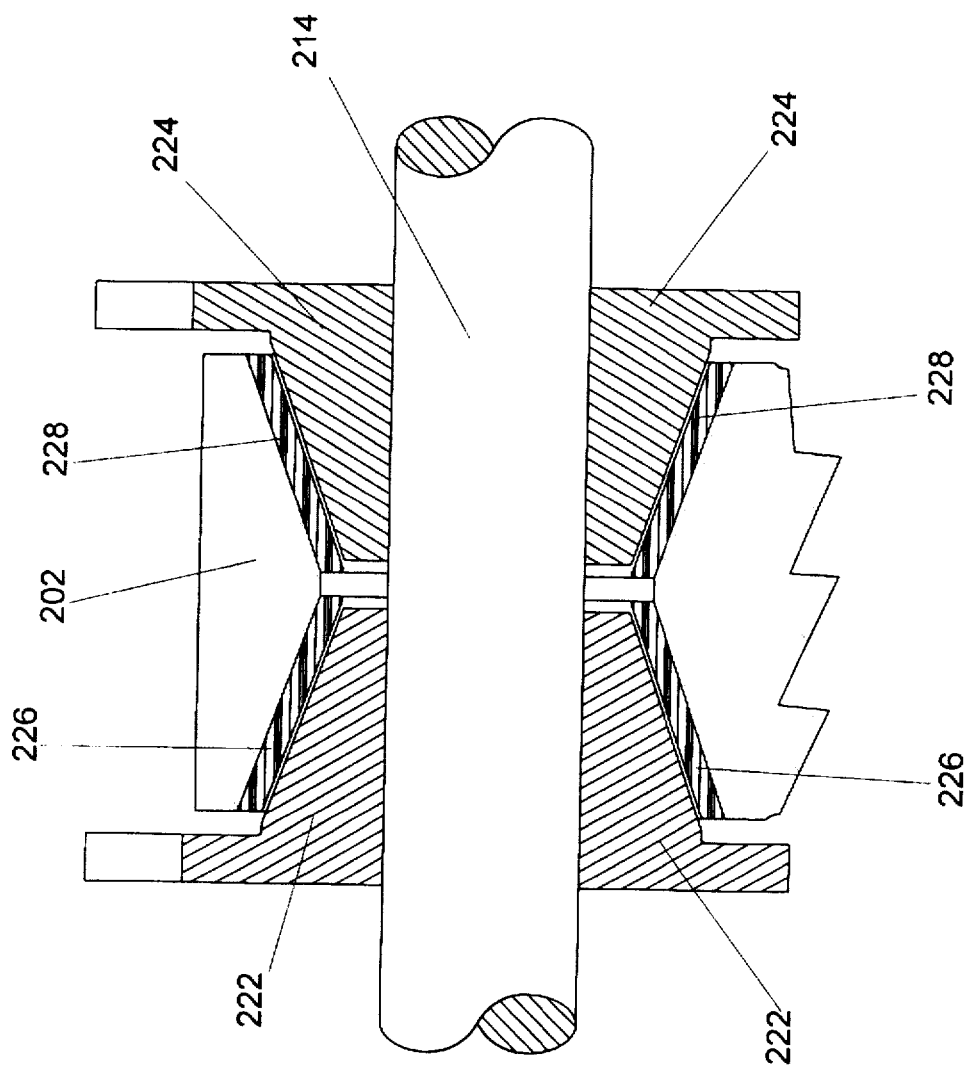
FIG. 4 is a cross sectional view through a rotation axis of a braked universal joint assembly according to the present invention.

A preferred embodiment of a braked universal joint 200 for rotatably joining two members according to the present invention is shown in FIGS. 3 and 4, and comprises: a central joint body 202 comprising four substantially orthogonal faces 203, 204, 205, and 206 and two bores 207 and 208 defining two substantially orthogonal rotation axes 209 and 210, a first end of bore 207 being located on face 203, a second end of bore 207 being located on opposing face 205, a first end of bore 208 being located on face 204, and a second end of bore 204 being located on opposing face 206, each of bores 207 and 208 comprising first and second coaxial right circular substantially frusto-conical sections 211 and 212, respectively, the bases of each of the frusto-conical sections coinciding with opposing faces of joint body 202; and two rotation assemblies, each rotation assembly being associated with one of the axes 209 and 210. The first rotation assembly is associated with axis 210 and comprises: a shaft 214 positioned coaxially within bore 208 in joint body 202 and having a first end 216 with a transverse hole 220 therethrough and a threaded second end 218; a locking pin 234 positioned within and extending from hole 220 through shaft 214; a first friction cone 226 comprising an outer right circular substantially frusto-conical surface corresponding to the first frusto-conical section 212 of bore 208 and an inner coaxial right circular substantially frusto-conical surface and positioned coaxially around shaft 214 against the first frusto-conical section 212 of bore 208; a second friction cone 228 comprising an outer right circular substantially frusto-conical surface corresponding to the second frusto-conical section 212 of bore 208 and an inner coaxial right circular substantially frusto-conical surface and positioned coaxially around shaft 214 against the second frusto-conical section 212 of bore 208; a first brake cone 222 comprising a right circular substantially frusto-conical section corresponding to the inner surface of first friction cone 226, a base, an axial bore, and a slotted flange extending radially outward from the base for substantially nonrotatably engaging the first joined member, and positioned coaxially around shaft 214 against the inner surface of first friction cone 226; a second brake cone 224 comprising a right circular substantially frusto-conical section corresponding to the inner surface of second friction cone 228, a base, an axial bore, and a slotted flange extending radially outward from the base for substantially nonrotatably engaging the first joined member, and positioned coaxially around shaft 214 against the inner surface of second friction cone 228; a first spring 230 positioned around shaft 214 against the base of first brake cone 222 and against locking pin 234; a second spring 232 positioned around shaft 214 against the base of second brake cone 224; a spacer 238 positioned around shaft 214 against second spring 232; and a nut 236 threadedly engaged onto second end 218 of shaft 214 and bearing against spacer 238. The second rotation assembly is associated with axis 209, has substantially the same structure as the first rotation assembly, and substantially nonrotatably engages the second joined member.

Each of the two members joined by universal joint 200 substantially nonrotatably engages one of the two rotation assemblies described hereinabove. Each joined member includes a structure for engaging the shaft and substantially nonrotatably engaging the brake cones of the corresponding universal joint rotation assembly. When assembled with the universal joint, the first joined member may rotate about axis 210 defined by bore 208. The load forces on the universal joint are transmitted from joint body 202 to shaft 214 via brake cones 222 and 224 and friction cones 226 and 228. The brake cones 222 and 224 rotate with the first joined member. Tightening of nut 236 results in compression of springs 230 and 232, thereby pressing friction cones 226 and 228 and joint body 202 between brake cones 222 and 224. Braking torque in the joint arises from the resulting frictional torques opposing rotation of brake cones 222 and 224 with respect to joint body 202. The degree of braking depends directly on the compressive force applied by tightening nut 236, all other conditions being equal. Brake cones 226 and 228 may be fabricated from any of a variety of friction materials known in the art possessing sufficient compressive strength to withstand the load bearing forces and sufficient shear strength to withstand the braking forces arising during use of the joint assembly, and are intended to be replaced as they wear out. Replacement of friction cones 226 and 228 is substantially less expensive than replacement of the entire universal joint 200, which would be required if joint body 202 and brake cones 222 and 224 came into direct contact with one another during relative rotation of the first joined member and joint body 202.

The second joined member substantially nonrotatably engages the second rotation assembly which is associated with axis 209 of universal joint 200. The structures and operation of the second joined member and second rotation assembly are substantially the same as those recited hereinabove for the first joined member and first rotation assembly. For the purposes of this specification it will be understood that any description pertaining to the structure or operation of a first joined member engaged with a first rotation assembly associated with a first rotation axis will apply substantially equally to a second joined member engaged with a second rotation assembly associated with a second rotation axis.

Both load bearing and braking functions are performed by the brake cones 222 and 224 and friction cones 226 and 228 in the preferred embodiment. Each joined member preferably includes a structure for engaging shaft 214 and substantially nonrotatably engaging brake cones 222 and 224. The load forces are borne by shaft 214 and transmitted to joint body 202 via brake cones 222 and 224 and friction cones 226 and 228. Rotation of the joined member occurs by rotation of the joined member, shaft 214, and brake cones 222 and 224 relative to joint body 202.

Braking devices and clutch mechanisms employing non-load bearing frusto-conical braking surfaces have been used previously in a variety of applications. Some of these are described in U.S. Pat. Nos.: 3,982,610; 4,099,601; 4,114, 732; 4,226,318; 4,433,764; 4,566,575; and 5,203,434.

Since no relative motion is required between shaft 214 and brake cones 222 and 224, the clearance of shaft 214 within the axial bore of brake cones 222 and 224 can be much smaller than the shaft/bushing clearance of previous joint assemblies. This results in more uniform load distribution about the surface of shaft 214 and greater overall load bearing capacity. The substantially frusto-conical surfaces of brake cones 222 and 224, friction cones 226 and 228, and bore 208 allow a very low-clearance fit between those surfaces even with relaxed manufacturing tolerances. The low-clearance fit in turn results in substantially uniform load distribution about those surfaces and in increased load carrying capacity of the joint assembly. The increased surface area of the friction cones relative to the bushing used in previous joint assemblies further increases the overall load carrying capacity of the present joint assembly. As the friction cones 226 and 228 wear and become thinner, further tightening of nut 236 restores the low-clearance fit, maintaining load carrying capacity as the friction cones wear and allowing longer intervals between replacement of the friction cones. Elimination of the bushing found in previous joint assemblies reduces the number of wearable parts from three in previous joint assemblies to two in the present joint assembly.

Rotation of the joined member occurs by rotation of brake cones 222 and 224 relative to joint body 202 about an axis defined by shaft 214 and the axes of the right circular substantially frusto-conical surfaces of bore 208, brake cones 222 and 224, and friction cones 226 and 228. Braking torques are generated by tightening nut 236, thereby compressing brake cones 222 and 224 into friction cones 226 and 228 and friction cones 226 and 228 into the frusto-conical sections of bore 208 in joint body 202. The forces thereby generated normal to the frusto-conical surfaces produce the frictional torque opposing rotation of brake cones 222 and 224 with respect to joint body 202.

The substantially frusto-conical braking surfaces in the present joint assembly result in much larger forces normal to the braking surfaces for a given compressive force applied by nut 236 compared to previous joint assemblies. In previous joint assemblies with flat brake discs and flat friction discs, the compressive force applied by the nut is transmitted directly to the braking surfaces. In the present joint assembly, the forces normal to the substantially frusto-conical braking surfaces are magnified by the mechanical advantage imparted by the wedge action of the frusto-conical surfaces, thereby allowing larger braking torques to be generated for a given force applied by nut 236 relative to braking torques generated by previous joint assemblies. This force magnification becomes larger for sharper substantially frusto-conical braking surfaces. Since the surface area of the frusto-conical braking surfaces is larger than the area of the flat braking surfaces, mechanical stresses and frictional heating are distributed over a larger area of the friction cone, thereby decreasing its rate of wear and increasing the intervals between its replacement.

Figure 5:
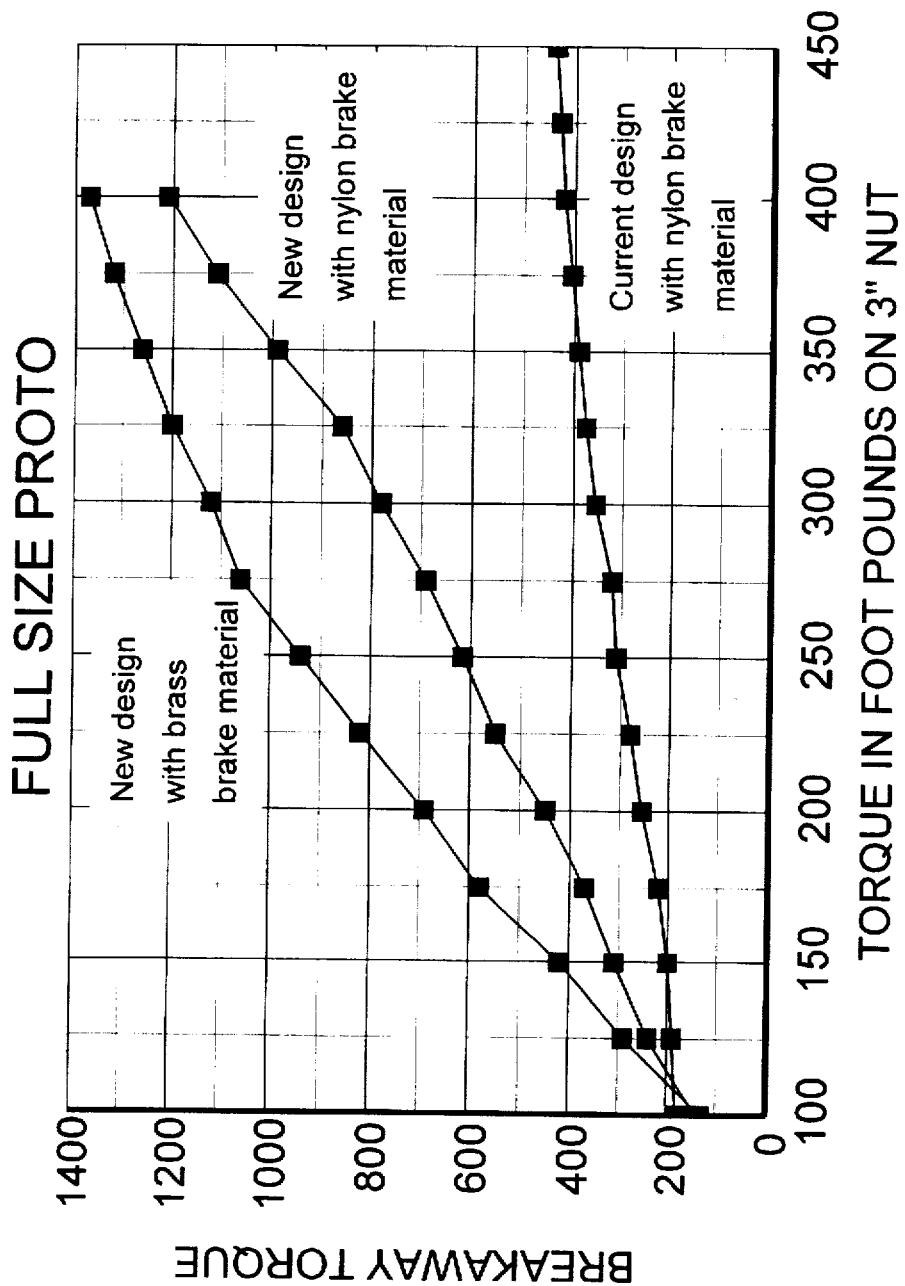
FIG. 5 is a graphical presentation of empirical test data comparing a previous braked universal joint to a braked universal joint according to the present invention.

FIG. 5 illustrates empirical test data comparing the braking characteristics of the present invention to the previous joint assembly. The data show that the braking torque of the present joint assembly is more than approximately twice that of the previous joint assembly for a given amount of force applied by tightening the nut, thereby allowing larger braking torques to be generated by the present joint assembly for a given amount of nut tightening, all other factors being equal. Equivalently, less than approximately half of the force applied to the present joint assembly by tightening the nut results in the same braking torque as occurs in the previous joint assembly. The present joint assembly can therefore be operated far below the yield points of the shaft and nut materials, reducing the strain and/or plastic deformation of the nut and shaft and thereby lengthening the useful life of the joint assembly. The present joint assembly therefore substantially eliminates the shaft and the nut as the "weak link" apparent in previous joint assemblies.

An alternative embodiment of the present invention comprises a single axis joint assembly, which is not shown in the Figures. The single axis joint assembly comprises: a joint body having a single bore substantially similar to the bores 207 or 208 described hereinabove; and a single rotation assembly substantially similar to the rotation assemblies described hereinabove. A first joined member is substantially rigidly connected to the joint body. A second joined member engages the shaft and substantially nonrotatably engages the brake cones as described hereinabove.

An alternative embodiment of the present invention may comprise rotation assemblies wherein the first friction cone and the first brake cone form an integral assembly, and the second friction cone and the second brake cone form an integral assembly.

In an alternative embodiment of the present invention, any mechanical means may be employed to compress the brake cones, friction cones, and joint body. Such mechanical means may include but are not limited to: hydraulic means, pneumatic means, levers, cams, push rods, pistons, nuts, screws, threads, clamps, retaining means on the shaft, functional equivalents thereof, and/or combinations thereof. The retaining means may include but are not limited to: a pin, a retaining ring, a snap ring, a radial flange, functional equivalents thereof, and/or combinations thereof.

Figure 6:
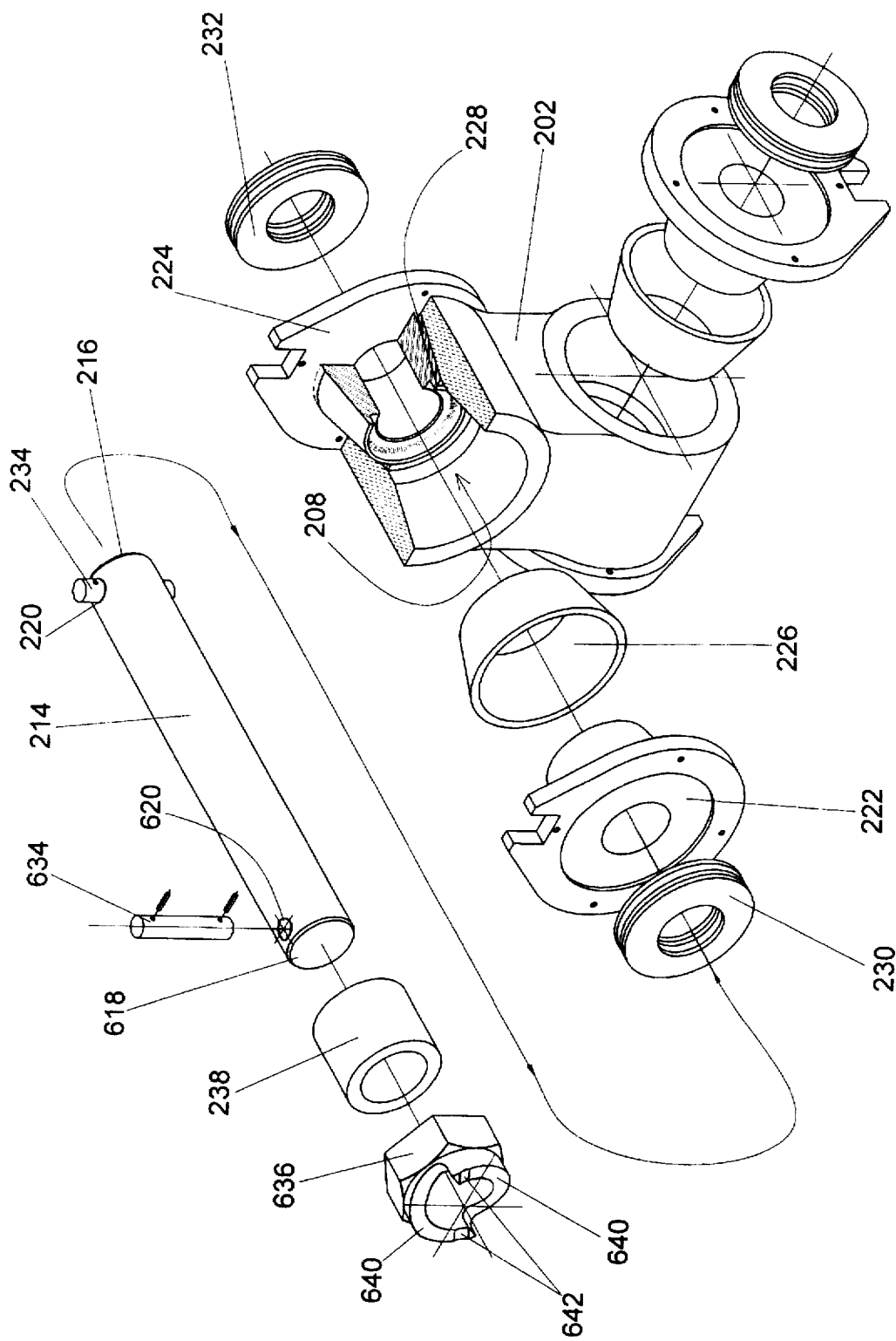
FIG. 6 is an exploded perspective view of a braked universal joint assembly according to the present invention. Portions of the central joint body and a brake cone are shown cut away.
Figure 7C:
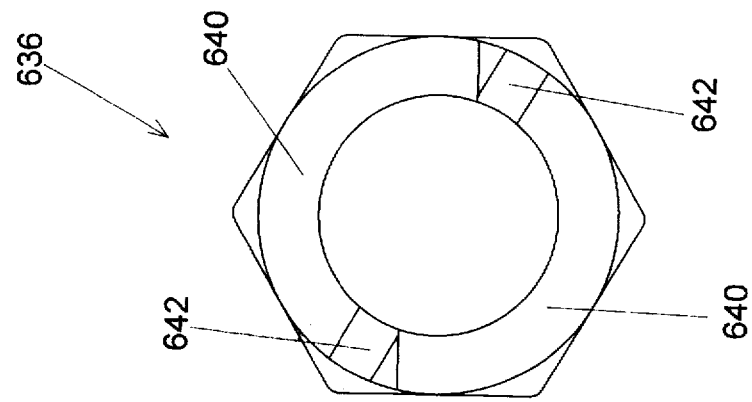
FIG. 7 shows side, top, and perspective views of a cam for a braked joint assembly according to the present invention.
Figure 7B:
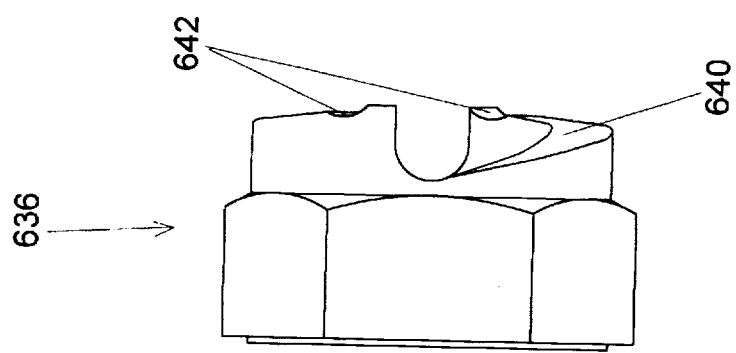
Figure 7A:
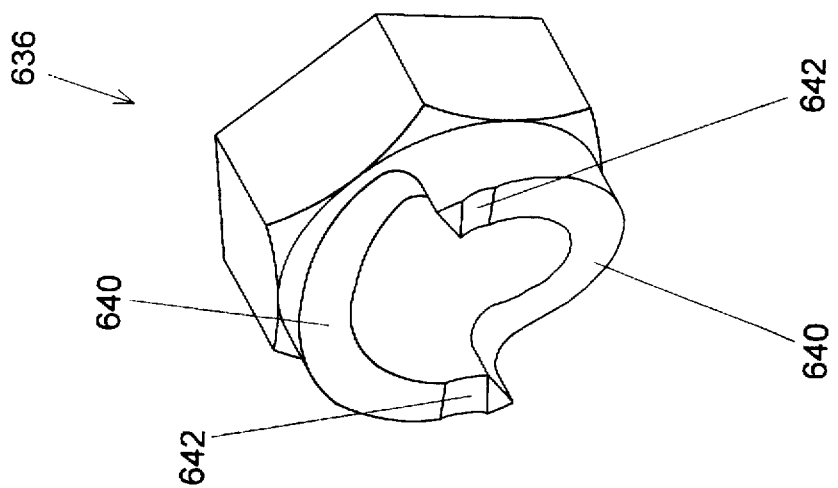

An alternative embodiment of the present invention employing a cam is shown in FIG. 6. In place of the threaded second end of shaft 214 is second end 618 with transverse hole 620 therethrough. Cam engaging pin 634 is positioned within hole 620. In place of nut 236, cam 636 is positioned on shaft 214 between spacer 238 and cam engaging pin 634. Several views showing details of cam 636 are shown in FIG. 7. Pin 634 is positioned against sloped surfaces 640 of cam 636. Rotation of cam 636 about shaft 214 pushes cam 636 toward the brake cone, thereby compressing the brake cones and friction cones against bore 208 of joint body 202. Each of sloped surfaces 640 may comprise a single slope of substantially constant inclination, a single slope of continuously varying inclination, and/or a set of discrete slopes of various inclinations. The upper end of each of sloped surfaces 640 may terminate in a detent portion 642 for engaging pin 634.

Figure 8:
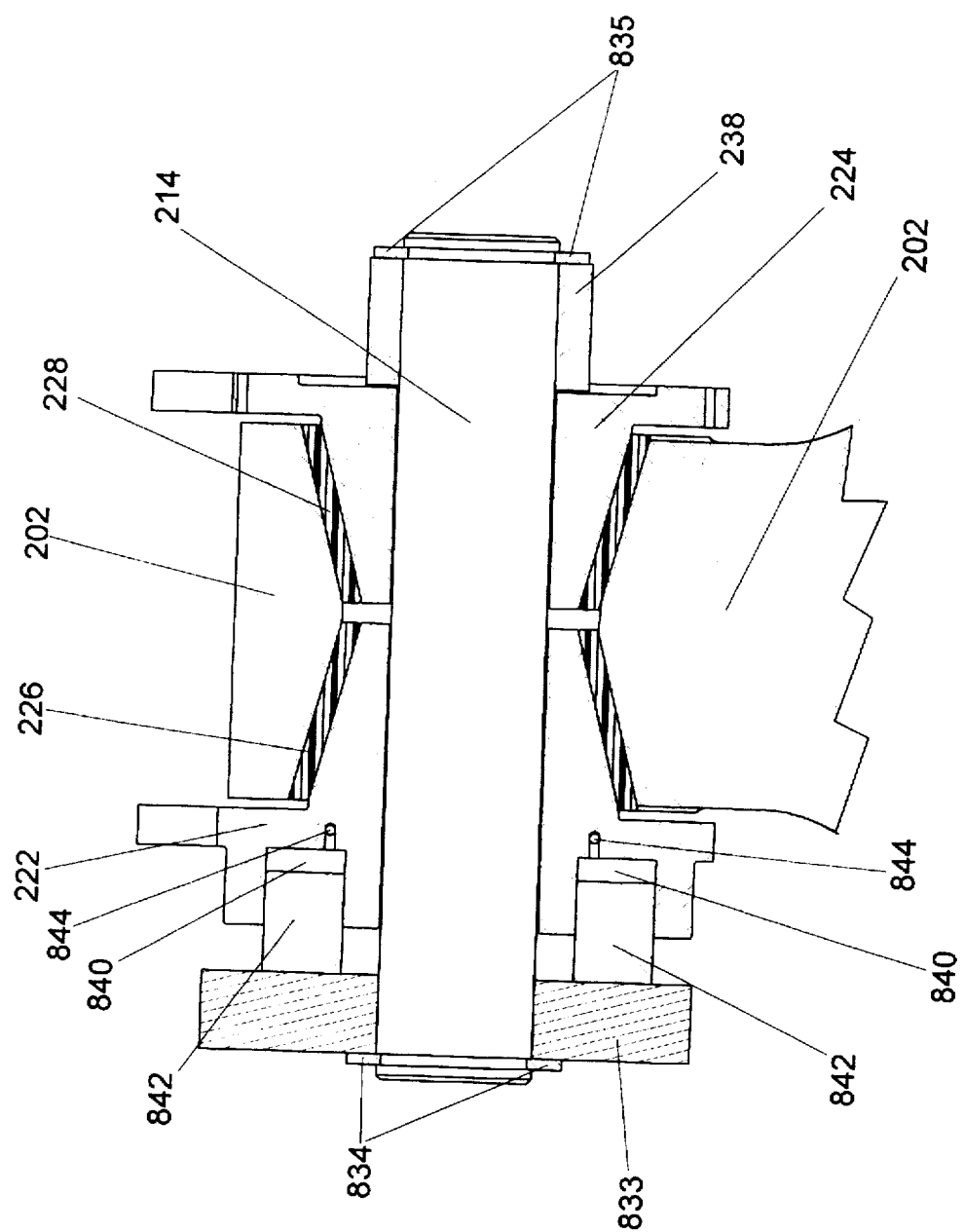
FIG. 8 is a cross sectional view through a rotation axis of a braked universal joint assembly according to the present invention.

An alternative embodiment of the present invention employing hydraulic means to compress the brake cones and the friction cones against bore 208 of joint body 202 is shown in FIG. 8. Shaft 214 is provided with retaining rings 834 and 835. Retaining plate 833 is positioned around shaft 214 between retaining ring 834 and brake cone 222. Plate 833 may comprise a portion of one of the joined members adapted to engage the joint assembly, or may be a component of the joint assembly. Brake cone 222 is provided with a plurality of hydraulic cylinders 840, each of which contains a hydraulic piston 842. Hydraulic cylinders 840 are connected to a common source of hydraulic fluid (not shown) by hydraulic fluid channels 844. As hydraulic fluid flow through channels 844 into cylinders 840, pistons 842 are forced outward from cylinders 840 and against plate 833, thereby compressing brke cones 222 and 224, friction cones 226 and 228, and spacer 238 between plate 833 and retaining ring 835.

In an alternative embodiment of the present invention the brake cones may further comprise a flange extending radially outward from the base of the brake cone. In an alternative embodiment of the present invention, means for substantially nonrotatably engaging the brake cone, with or without a flange, with the joined member may include, but need not be limited to: screws, bolts, rivets, one or more mating holes and pins, one or more mating protuberances and depressions, one or more mating tabs and slots, functional equivalents thereof, or any combination thereof.

In an alternative embodiment of the present invention the springs may comprise any means for elastically transmitting compressive forces to the brake cones, including but not limited to: belleville springs, coil springs, leaf springs, elastomeric springs, hydraulic springs, pneumatic springs, functional equivalents thereof, or any combination thereof.

In an alternative embodiment of the present invention, the shapes of the right circular substantially frusto-conical bore sections, friction cone surfaces, and brake cone sections may assume any tapering shape having rotational symmetry about the rotation axis. Such shapes include but are not limited to: cones, ellipsoids of revolution, paraboloids of revolution, hyperboloids of revolution, spheres, or any other surface of revolution having a radius decreasing monotonically with distance along the rotation axis.

The present invention has been set forth in the form of its preferred and alternative embodiments. It is nevertheless intended that modifications to the disclosed braked joint assemblies may be made without departing from inventive concepts disclosed and/or claimed herein.

What is claimed is:

1. A braked joint assembly for rotatably joining a first joined member and a second joined member, said braked joint assembly comprising:

a joint body for substantially rigidly connecting to said first joined member and comprising four substantially orthogonal faces and a bore defining a rotation axis, the bore comprising first and second coaxial right circular substantially frusto-conical sections each comprising a base, the bases of each of the frusto-conical sections coinciding with opposing faces of said joint body;

a rotation assembly for substantially nonrotatably engaging said second joined member and allowing relative rotation of said joint body and said second joined member about the rotation axis, comprising a shaft positioned coaxially within the bore in said joint body and comprising a first end and a second end, a first friction cone comprising an outer right circular substantially frusto-conical surface corresponding to the first frusto-conical section of the bore and an inner coaxial right circular substantially frusto-conical surface and positioned coaxially around the shaft against the first frusto-conical section of the bore, a second friction cone comprising an outer right circular substantially frusto-conical surface corresponding to the second frusto-conical section of the bore and an inner coaxial right circular substantially frusto-conical surface and positioned coaxially around the shaft against the second frusto-conical section of the bore, a first brake cone comprising a right circular substantially frusto-conical section corresponding to the inner surface of the first friction cone, a base, an axial bore for receiving the shaft, and means for substantially nonrotatably engaging said second joined member, and positioned coaxially around the shaft against the inner surface of the first friction cone, and a second brake cone comprising a right circular substantially frusto-conical section corresponding to the inner surface of the second friction cone, a base, an axial bore for receiving the shaft, and means for substantially nonrotatably engaging said second joined member, and positioned coaxially around the shaft against the inner surface of the second friction cone; and means for compressing the first and second friction cones and said joint body between the first and second brake cones, thereby generating a frictional torque opposing relative rotation of said joint body with respect to the first and second brake cones and said second joined member engaged therewith about the rotation axis, wherein:

a load force between said second joined member and said joint body is substantially borne by the first and second frusto-conical sections of the bore, the frusto-conical sections of the first and second brake cones of said rotation assembly, and the first and second friction cones of said rotation assembly;

the compressing means of said rotation assembly comprises means, positioned at the first end of the shaft, for retaining the first brake cone on the shaft, and means, positioned at the second end of the shaft, for pushing the second brake cone against the second friction cone;

the first end of the shaft of said rotation assembly is provided with a transverse hole, and the retaining means of said rotation assembly comprises a locking pin positioned therethrough;

the second end of the shaft of said rotation assembly is provided with a transverse hole, and the pushing means of said rotation assembly comprises a cam engaging pin positioned therethrough, a cam positioned on the shaft between the cam engaging pin and the second brake cone, and a spacer positioned between the cam and the second brake cone; and rotation of the cam about the shaft and engagement of the cam engaging pin by the cam serve to push the second brake cone against the second friction cone.

2. A joint assembly as recited in claim 1, wherein said rotation assembly further comprises a first belleville spring positioned between the locking pin and the first brake cone, and a second belleville spring positioned between the spacer and the second brake cone.

3. A joint assembly as recited in claim 2, wherein the engaging means of the first brake cone of said rotation assembly comprises a slotted flange extending radially outward from the base of the first brake cone, and the engaging means of the second brake cone of said rotation assembly comprises a slotted flange extending radially outward from the base of the second brake cone.

4. A braked universal joint assembly for rotatably joining a first joined member and a second joined member, said braked universal joint assembly comprising:

a joint body comprising four substantially orthogonal faces and first and second bores defining first and second rotation axes, respectively, the first and second rotation axes being substantially orthogonal, each of the first and second bores comprising first and second coaxial right circular substantially frusto-conical sections each comprising a base, the bases of each of the frusto-conical sections coinciding with opposing faces of said joint body;

a first rotation assembly for substantially nonrotatably engaging said first joined member and allowing relative rotation of said joint body and said first joined member about the first rotation axis, comprising a shaft positioned coaxially within the first bore in said joint body and comprising a first end and a second end, a first friction cone comprising an outer right circular substantially frusto-conical surface corresponding to the first frusto-conical section of the first bore and an inner coaxial right circular substantially frusto-conical surface and positioned coaxially around the shaft against the first frusto-conical section of the first bore, a second friction cone comprising an outer right circular substantially frusto-conical surface corresponding to the second frusto-conical section of the first bore and an inner coaxial right circular substantially frusto-conical surface and positioned coaxially around the shaft against the second frusto-conical section of the first bore, a first brake cone comprising a right circular substantially frusto-conical section corresponding to the inner surface of the first friction cone, a base, an axial bore for receiving the shaft, and means for substantially nonrotatably engaging said first joined member, and positioned coaxially around the shaft against the inner surface of the first friction cone, a second brake cone comprising a right circular substantially frusto-conical section corresponding to the inner surface of the second friction cone, a base, an axial bore for receiving the shaft, and means for substantially nonrotatably engaging said first joined member, and positioned coaxially around the shaft against the inner surface of the second friction cone, and means for compressing the first and second friction cones and said joint body between the first and second brake cones, thereby generating a frictional torque opposing relative rotation of said joint body with respect to the first and second brake cones and said first joined member engaged therewith about the first rotation axis; and a second rotation assembly for substantially nonrotatably engaging said second joined member and allowing relative rotation of said joint body and said second joined member about the second rotation axis, comprising a shaft positioned coaxially within the second bore in said joint body and comprising a first end and a second end, a first friction cone comprising an outer right circular substantially frusto-conical surface corresponding to the first frusto-conical section of the second bore and an inner coaxial right circular substantially frusto-conical surface and positioned coaxially around the shaft against the first frusto-conical section of the second bore, a second friction cone comprising an outer right circular substantially frusto-conical surface corresponding to the second frusto-conical section of the second bore and an inner coaxial right circular substantially frusto-conical surface and positioned coaxially around the shaft against the second frusto-conical section of the second bore, a first brake cone comprising a right circular substantially frusto-conical section corresponding to the inner surface of the first friction cone, a base, an axial bore for receiving the shaft, and means for substantially nonrotatably engaging said second joined member, and positioned coaxially around the shaft against the inner surface of the first friction cone, a second brake cone comprising a right circular substantially frusto-conical section corresponding to the inner surface of the second friction cone, a base, an axial bore for receiving the shaft, and means for substantially nonrotatably engaging said second joined member, and positioned coaxially around the shaft against the inner surface of the second friction cone, and means for compressing the first and second friction cones and said joint body between the first and second brake cones, thereby generating a frictional torque opposing relative rotation of said joint body with respect to the first and second brake cones and said second joined member engaged therewith about the second rotation axis, wherein:

a load force between said first joined member and said joint body is substantially borne by the first and second frusto-conical sections of the first bore, the frusto-conical sections of the first and second brake cones of said first rotation assembly, and the first and second friction cones of said first rotation assembly;

a load force between said second joined member and said joint body is substantially borne by the first and second frusto-conical sections of the second bore, the frusto-conical sections of the first and second brake cones of said second rotation assembly, and the first and second friction cones of said second rotation assembly;

the compressing means of said first rotation assembly comprises means, positioned at the first end of the shaft, for retaining the first brake cone on the shaft, and means, positioned at the second end of the shaft, for pushing the second brake cone against the second friction cone;

the compressing means of said second rotation assembly comprises means, positioned at the first end of the shaft, for retaining the first brake cone on the shaft, and means, positioned at the second end of the shaft, for pushing the second brake cone against the second friction cone;

the first end of the shaft of said first rotation assembly is provided with a transverse hole, and the retaining means of said first rotation assembly comprises a locking pin positioned therethrough;

the first end of the shaft of said second rotation assembly is provided with a transverse hole, and the retaining means of said second rotation assembly comprises a locking pin positioned therethrough;

the second end of the shaft of said first rotation assembly is provided with a transverse hole, and the pushing means of said first rotation assembly comprises a cam engaging pin positioned therethrough, a cam positioned on the shaft between the cam engaging pin and the second brake cone, and a spacer positioned between the cam and the second brake cone;

rotation of the cam about the shaft and engagement of the cam engaging pin by the cam serve to push the second brake cone against the second friction cone;

the second end of the shaft of said second rotation assembly is provided with a transverse hole, and the pushing means of said second rotation assembly comprises a cam engaging pin positioned therethrough, a cam positioned on the shaft between the cam engaging pin and the second brake cone, a spacer positioned between the cam and the second brake cone; and rotation of the cam about the shaft and engagement of the cam engaging pin by the cam serve to push the second brake cone against the second friction cone.

5. A universal joint assembly as recited in claim 4, wherein:

said first rotation assembly further comprises a first belleville spring positioned between the locking pin and the first brake cone, and a second belleville spring positioned between the spacer and the second brake cone; and said second rotation assembly further comprises a first belleville spring positioned between the locking pin and the first brake cone, and a second belleville spring positioned between the spacer and the second brake cone.

6. A universal joint assembly as recited in claim 5, wherein:

the engaging means of the first brake cone of said first rotation assembly comprises a slotted flange extending radially outward from the base of the first brake cone, the engaging means of the second brake cone of said first rotation assembly comprises a slotted flange extending radially outward from the base of the second brake cone, the engaging means of the first brake cone of said second rotation assembly comprises a slotted flange extending radially outward from the base of the first brake cone, and the engaging means of the second brake cone of said second rotation assembly comprises a slotted flange extending radially outward from the base of the second brake cone.

7. A braked grapple pivot joint assembly for rotatably suspending a grapple from a boom of a logging skidder, said braked grapple pivot joint assembly comprising:

a joint body comprising four substantially orthogonal faces and first and second bores defining first and second rotation axes, respectively, the first and second rotation axes being substantially orthogonal, each of the first and second bores comprising first and second coaxial right circular substantially frusto-conical sections each comprising a base, the bases of each of the frusto-conical sections coinciding with opposing faces of said joint body;

a first rotation assembly for substantially nonrotatably engaging said boom and allowing relative rotation of said joint body and said boom about the first rotation axis, comprising a shaft positioned coaxially within the first bore in said joint body and comprising a first end and a second end, a first friction cone comprising an outer right circular substantially frusto-conical surface corresponding to the first frusto-conical section of the first bore and an inner coaxial right circular substantially frusto-conical surface and positioned coaxially around the shaft against the first frusto-conical section of the first bore, a second friction cone comprising an outer right circular substantially frusto-conical surface corresponding to the second frusto-conical section of the first bore and an inner coaxial right circular substantially frusto-conical surface and positioned coaxially around the shaft against the second frusto-conical section of the first bore, a first brake cone comprising a right circular substantially frusto-conical section corresponding to the inner surface of the first friction cone, a base, an axial bore for receiving the shaft, and means for substantially nonrotatably engaging said boom, and positioned coaxially around the shaft against the inner surface of the first friction cone, a second brake cone comprising a right circular substantially frusto-conical section corresponding to the inner surface of the second friction cone, a base, an axial bore for receiving the shaft, and means for substantially nonrotatably engaging said boom, and positioned coaxially around the shaft against the inner surface of the second friction cone, and means for compressing the first and second friction cones and said joint body between the first and second brake cones, thereby generating a frictional torque opposing relative rotation of said joint body with respect to the first and second brake cones and said boom engaged therewith about the first rotation axis; and a second rotation assembly for substantially nonrotatably engaging said grapple and allowing relative rotation of said joint body and said grapple about the second rotation axis, comprising a shaft positioned coaxially within the second bore in said joint body and comprising a first end and a second end, a first friction cone comprising an outer right circular substantially frusto-conical surface corresponding to the first frusto-conical section of the second bore and an inner coaxial right circular substantially frusto-conical surface and positioned coaxially around the shaft against the first frusto-conical section of the second bore, a second friction cone comprising an outer right circular substantially frusto-conical surface corresponding to the second frusto-conical section of the second bore and an inner coaxial right circular substantially frusto-conical surface and positioned coaxially around the shaft against the second frusto-conical section of the second bore, a first brake cone comprising a right circular substantially frusto-conical section corresponding to the inner surface of the first friction cone, a base, an axial bore for receiving the shaft, and means for substantially nonrotatably engaging said grapple, and positioned coaxially around the shaft against the inner surface of the first friction cone, a second brake cone comprising a right circular substantially frusto-conical section corresponding to the inner surface of the second friction cone, a base, an axial bore for receiving the shaft, and means for substantially nonrotatably engaging said grapple, and positioned coaxially around the shaft against the inner surface of the second friction cone, and means for compressing the first and second friction cones and said joint body between the first and second brake cones, thereby generating a frictional torque opposing relative rotation of said joint body with respect to the first and second brake cones and said grapple engaged therewith about the second rotation axis.

wherein:

a load force between said boom and said joint body is substantially borne by the first and second frusto-conical sections of the first bore, the frusto-conical sections of the first and second brake cones of said first rotation assembly, and the first and second friction cones of said first rotation assembly;

a load force between said grapple and said joint body is substantially borne by the first and second frusto-conical sections of the second bore, the frusto-conical sections of the first and second brake cones of said second rotation assembly, and the first and second friction cones of said second rotation assembly;

the compressing means of said first rotation assembly comprises
- means, positioned at the first end of the shaft, for retaining the first brake cone on the shaft, and
- means, positioned at the second end of the shaft, for pushing the second brake cone against the second friction cone;

the compressing means of said second rotation assembly comprises
- means, positioned at the first end of the shaft, for retaining the first brake cone on the shaft, and
- means, positioned at the second end of the shaft, for pushing the second brake cone against the second friction cone;

the first end of the shaft of said first rotation assembly is provided with a transverse hole, and the retaining means of said first rotation assembly comprises a locking pin positioned therethrough;

the first end of the shaft of said second rotation assembly is provided with a transverse hole, and the retaining means of said second rotation assembly comprises a locking pin positioned therethrough;

the second end of the shaft of said first rotation assembly is provided with a transverse hole, and the pushing means of said first rotation assembly comprises a cam engaging pin positioned therethrough, a cam positioned on the shaft between the cam engaging pin and the second brake cone, and a spacer positioned between the cam and the second brake cone;

wherein rotation of the cam about the shaft and engagement of the cam engaging pin by the cam serve to push the second brake cone against the second friction cone;

the second end of the shaft of said second rotation assembly is provided with a transverse hole, and the pushing means of said second rotation assembly comprises a cam engaging pin positioned therethrough, a cam positioned on the shaft between the cam engaging pin and the second brake cone, a spacer positioned between the cam and the second brake cone; and wherein rotation of the cam about the shaft and engagement of the cam engaging pin by the cam serve to push the second brake cone against the second friction cone.

8. A grapple pivot joint assembly as recited in claim 7, wherein:

said first rotation assembly further comprises a first belleville spring positioned between the locking pin and the first brake cone, and a second belleville spring positioned between the spacer and the second brake cone; and said second rotation assembly further comprises a first belleville spring positioned between the locking pin and the first brake cone, and a second belleville spring positioned between the spacer and the second brake cone.

9. A grapple pivot joint assembly as recited in claim 8, wherein:

the engaging means of the first brake cone of said first rotation assembly comprises a slotted flange extending radially outward from the base of the first brake cone;

the engaging means of the second brake cone of said first rotation assembly comprises a slotted flange extending radially outward from the base of the second brake cone;

the engaging means of the first brake cone of said second rotation assembly comprises a slotted flange extending radially outward from the base of the first brake cone; and the engaging means of the second brake cone of said second rotation assembly comprises a slotted flange extending radially outward from the base of the second brake cone.

10. A braked joint assembly for rotatably joining a first joined member and a second joined member, said braked joint assembly comprising:

a joint body for substantially rigidly connecting to said first joined member and comprising four substantially orthogonal faces and a bore defining a rotation axis, the bore comprising first and second coaxial right circular substantially frusto-conical sections each comprising a base, the bases of each of the frusto-conical sections coinciding with opposing faces of said joint body; and a rotation assembly for substantially nonrotatably engaging said second joined member and allowing relative rotation of said joint body and said second joined member about the rotation axis, comprising a shaft positioned coaxially within the bore in said joint body and comprising a first end and a second end, a first friction cone comprising an outer right circular substantially frusto-conical surface corresponding to the first frusto-conical section of the bore and an inner coaxial right circular substantially frusto-conical surface and positioned coaxially around the shaft against the first frusto-conical section of the bore, a second friction cone comprising an outer right circular substantially frusto-conical surface corresponding to the second frusto-conical section of the bore and an inner coaxial right circular substantially frusto-conical surface and positioned coaxially around the shaft against the second frusto-conical section of the bore, a first brake cone comprising a right circular substantially frusto-conical section corresponding to the inner surface of the first friction cone, a base, an axial bore for receiving the shaft, and means for substantially nonrotatably engaging said second joined member, and positioned coaxially around the shaft against the inner surface of the first friction cone, a second brake cone comprising a right circular substantially frusto-conical section corresponding to the inner surface of the second friction cone, a base, an axial bore for receiving the shaft, and means for substantially nonrotatably engaging said second joined member, and positioned coaxially around the shaft against the inner surface of the second friction cone, and means for compressing the first and second friction cones and said joint body between the first and second brake cones, thereby generating a frictional torque opposing relative rotation of said joint body with respect to the first and second brake cones and said second joined member engaged therewith about the rotation axis, wherein:

a load force between said second joined member and said joint body is substantially borne by the first and second frusto-conical sections of the bore, the frusto-conical sections of the first and second brake cones of said rotation assembly, and the first and second friction cones of said rotation assembly;

the compressing means comprises a first retainer positioned at the first end of the shaft, a second retainer positioned at the second end of the shaft, and at least one hydraulic cylinder in the base of the first brake cone with a corresponding hydraulic piston reciprocatably positioned therein; and flow of hydraulic fluid into each of the at least one hydraulic cylinder pushes the corresponding piston against the first retainer, thereby compressing the first and second friction cones and said joint body between the first and second brake cones.

11. A braked universal joint assembly for rotatably joining a first joined member and a second joined member, said braked universal joint assembly comprising:

a joint body comprising four substantially orthogonal faces and first and second bores defining first and second rotation axes, respectively, the first and second rotation axes being substantially orthogonal, each of the first and second bores comprising first and second coaxial right circular substantially frusto-conical sections each comprising a base, the bases of each of the frusto-conical sections coinciding with opposing faces of said joint body;

a first rotation assembly for substantially nonrotatably engaging said first joined member and allowing relative rotation of said joint body and said first joined member about the first rotation axis, comprising a shaft positioned coaxially within the first bore in said joint body and comprising a first end and a second end, a first friction cone comprising an outer right circular substantially frusto-conical surface corresponding to the first frusto-conical section of the first bore and an inner coaxial right circular substantially frusto-conical surface and positioned coaxially around the shaft against the first frusto-conical section of the first bore, a second friction cone comprising an outer right circular substantially frusto-conical surface corresponding to the second frusto-conical section of the first bore and an inner coaxial right circular substantially frusto-conical surface and positioned coaxially around the shaft against the second frusto-conical section of the first bore, a first brake cone comprising a right circular substantially frusto-conical section corresponding to the inner surface of the first friction cone, a base, an axial bore for receiving the shaft, and means for substantially nonrotatably engaging said first joined member, and positioned coaxially around the shaft against the inner surface of the first friction cone, a second brake cone comprising a right circular substantially frusto-conical section corresponding to the inner surface of the second friction cone, a base, an axial bore for receiving the shaft, and means for substantially nonrotatably engaging said first joined member, and positioned coaxially around the shaft against the inner surface of the second friction cone, and means for compressing the first and second friction cones and said joint body between the first and second brake cones, thereby generating a frictional torque opposing relative rotation of said joint body with respect to the first and second brake cones and said first joined member engaged therewith about the first rotation axis; and a second rotation assembly for substantially nonrotatably engaging said second joined member and allowing relative rotation of said joint body and said second joined member about the second rotation axis, comprising a shaft positioned coaxially within the second bore in said joint body and comprising a first end and a second end, a first friction cone comprising an outer right circular substantially frusto-conical surface corresponding to the first frusto-conical section of the second bore and an inner coaxial right circular substantially frusto-conical surface and positioned coaxially around the shaft against the first frusto-conical section of the second bore, a second friction cone comprising an outer right circular substantially frusto-conical surface corresponding to the second frusto-conical section of the second bore and an inner coaxial right circular substantially frusto-conical surface and positioned coaxially around the shaft against the second frusto-conical section of the second bore, a first brake cone comprising a right circular substantially frusto-conical section corresponding to the inner surface of the first friction cone, a base, an axial bore for receiving the shaft, and means for substantially nonrotatably engaging said second joined member, and positioned coaxially around the shaft against the inner surface of the first friction cone, a second brake cone comprising a right circular substantially frusto-conical section corresponding to the inner surface of the second friction cone, a base, an axial bore for receiving the shaft, and means for substantially nonrotatably engaging said second joined member, and positioned coaxially around the shaft against the inner surface of the second friction cone, and means for compressing the first and second friction cones and said joint body between the first and second brake cones, thereby generating a frictional torque opposing relative rotation of said joint body with respect to the first and second brake cones and said second joined member engaged therewith about the second rotation axis, wherein:

a load force between said first joined member and said joint body is substantially borne by the first and second frusto-conical sections of the first bore, the frusto-conical sections of the first and second brake cones of said first rotation assembly, and the first and second friction cones of said first rotation assembly;

a load force between said second joined member and said joint body is substantially borne by the first and second frusto-conical sections of the second bore, the frusto-conical sections of the first and second brake cones of said second rotation assembly, and the first and second friction cones of said second rotation assembly;

the compressing means of said first rotation assembly comprises a first retainer positioned at the first end of the shaft, a second retainer positioned at the second end of the shaft, and at least one hydraulic cylinder in the base of the first brake cone with a hydraulic piston reciprocatably positioned therein;

wherein flow of hydraulic fluid into each of the at least one hydraulic cylinder pushes the corresponding hydraulic piston against the first retainer, thereby compressing the first and second friction cones and said joint body between the first and second brake cones;

wherein the compressing means of said second rotation assembly comprises a first retainer positioned at the first end of the shaft, a second retainer positioned at the second end of the shaft, and at least one hydraulic cylinder in the base of the first brake cone with a corresponding hydraulic piston reciprocatably positioned therein; and wherein flow of hydraulic fluid into each of the at least one hydraulic cylinder pushes the corresponding hydraulic piston against the respective retainer, thereby compressing the first and second friction cones and said joint body between the first and second brake cones.

12. A braked grapple pivot joint assembly for rotatably suspending a grapple from a boom of a logging skidder, said braked grapple pivot joint assembly comprising:

a joint body comprising four substantially orthogonal faces and first and second bores defining first and second rotation axes, respectively, the first and second rotation axes being substantially orthogonal, each of the first and second bores comprising first and second coaxial right circular substantially frusto-conical sections each comprising a base, the bases of each of the frusto-conical sections coinciding with opposing faces of said joint body;

a first rotation assembly for substantially nonrotatably engaging said boom and allowing relative rotation of said joint body and said boom about the first rotation axis, comprising a shaft positioned coaxially within the first bore in said joint body and comprising a first end and a second end, a first friction cone comprising an outer right circular substantially frusto-conical surface corresponding to the first frusto-conical section of the first bore and an inner coaxial right circular substantially frusto-conical surface and positioned coaxially around the shaft against the first frusto-conical section of the first bore, a second friction cone comprising an outer right circular substantially frusto-conical surface corresponding to the second frusto-conical section of the first bore and an inner coaxial right circular substantially frusto-conical surface and positioned coaxially around the shaft against the second frusto-conical section of the first bore, a first brake cone comprising a right circular substantially frusto-conical section corresponding to the inner surface of the first friction cone, a base, an axial bore for receiving the shaft, and means for substantially nonrotatably engaging said boom, and positioned coaxially around the shaft against the inner surface of the first friction cone, a second brake cone comprising a right circular substantially frusto-conical section corresponding to the inner surface of the second friction cone, a base, an axial bore for receiving the shaft, and means for substantially nonrotatably engaging said boom, and positioned coaxially around the shaft against the inner surface of the second friction cone, and means for compressing the first and second friction cones and said joint body between the first and second brake cones, thereby generating a frictional torque opposing relative rotation of said joint body with respect to the first and second brake cones and said boom engaged therewith about the first rotation axis; and a second rotation assembly for substantially nonrotatably engaging said grapple and allowing relative rotation of said joint body and said grapple about the second rotation axis, comprising a shaft positioned coaxially within the second bore in said joint body and comprising a first end and a second end, a first friction cone comprising an outer right circular substantially frusto-conical surface corresponding to the first frusto-conical section of the second bore and an inner coaxial right circular substantially frusto-conical surface and positioned coaxially around the shaft against the first frusto-conical section of the second bore, a second friction cone comprising an outer right circular substantially frusto-conical surface corresponding to the second frusto-conical section of the second bore and an inner coaxial right circular substantially frusto-conical surface and positioned coaxially around the shaft against the second frusto-conical section of the second bore, a first brake cone comprising a right circular substantially frusto-conical section corresponding to the inner surface of the first friction cone, a base, an axial bore for receiving the shaft, and means for substantially nonrotatably engaging said grapple, and positioned coaxially around the shaft against the inner surface of the first friction cone, a second brake cone comprising a right circular substantially frusto-conical section corresponding to the inner surface of the second friction cone, a base, an axial bore for receiving the shaft, and means for substantially nonrotatably engaging said grapple, and positioned coaxially around the shaft against the inner surface of the second friction cone, and means for compressing the first and second friction cones and said joint body between the first and second brake cones, thereby generating a frictional torque opposing relative rotation of said joint body with respect to the first and second brake cones and said grapple engaged therewith about the second rotation axis, wherein:

a load force between said boom and said joint body is substantially borne by the first and second frusto-conical sections of the first bore, the frusto-conical sections of the first and second brake cones of said first rotation assembly, and the first and second friction cones of said first rotation assembly;

a load force between said grapple and said joint body is substantially borne by the first and second frusto-conical sections of the second bore, the frusto-conical sections of the first and second brake cones of said second rotation assembly, and the first and second friction cones of said second rotation assembly;

the compressing means of said first rotation assembly comprises a first retainer positioned at the first end of the shaft, a second retainer positioned at the second end of the shaft, and at least one hydraulic cylinder in the base of the first brake cone with a corresponding hydraulic piston reciprocatably positioned therein;

flow of hydraulic fluid into each of the at least one hydraulic cylinder pushes the corresponding hydraulic piston against the first retainer, thereby compressing the first and second friction cones and said joint body between the first and second brake cones;

the compressing means of said second rotation assembly comprises a first retainer positioned at the first end of the shaft, a second retainer positioned at the second end of the shaft, and at least one hydraulic cylinder in the base of the first brake cone with a corresponding hydraulic piston reciprocatably positioned therein; and flow of hydraulic fluid into each of the at least one hydraulic cylinder pushes the corresponding hydraulic piston against the first retainer, thereby compressing the first and second friction cones and said joint body between the first and second brake cones.

* * * * *